United States Patent
Kim et al.

(10) Patent No.: US 8,482,688 B2
(45) Date of Patent: Jul. 9, 2013

(54) ARRAY SUBSTRATE HAVING STORAGE VOLTAGE LINES, LIQUID CRYSTAL DISPLAY PANEL HAVING THE ARRAY SUBSTRATE AND LIQUID CRYSTAL DISPLAY DEVICE HAVING THE LIQUID CRYSTAL DISPLAY PANEL

(75) Inventors: Hyuk-Jin Kim, Cheonan-si (KR); Kyung-Wook Kim, Seoul (KR); Dong-Wuuk Seo, Cheonan-si (KR)

(73) Assignee: Samsung Display Co., Ltd., Yongin (KR)

( * ) Notice: Subject to any disclaimer, the term of this patent is extended or adjusted under 35 U.S.C. 154(b) by 989 days.

(21) Appl. No.: 11/469,974

(22) Filed: Sep. 5, 2006

(65) Prior Publication Data
US 2007/0070027 A1    Mar. 29, 2007

(30) Foreign Application Priority Data

Sep. 3, 2005    (KR) .................. 10-2005-0081975

(51) Int. Cl.
| | |
|---|---|
| G02F 1/1343 | (2006.01) |
| G02F 1/1345 | (2006.01) |
| G09G 3/18 | (2006.01) |
| G09G 3/36 | (2006.01) |
| H01L 29/04 | (2006.01) |
| H01L 29/10 | (2006.01) |
| H01L 31/00 | (2006.01) |
| H01L 27/14 | (2006.01) |
| H01L 29/15 | (2006.01) |
| H01L 31/036 | (2006.01) |

(52) U.S. Cl.
USPC ............. 349/39; 349/139; 349/149; 349/152; 345/52; 345/104; 257/59; 257/72

(58) Field of Classification Search
USPC ............... 349/39, 149–152, 38, 139; 257/59, 257/72; 345/50–52, 55, 84, 87, 104
See application file for complete search history.

(56) References Cited

U.S. PATENT DOCUMENTS

| | | | | |
|---|---|---|---|---|
| 5,311,342 | A | * | 5/1994 | Watanabe ..................... 349/152 |
| 6,621,537 | B1 | * | 9/2003 | Nakamura et al. ............. 349/43 |
| 6,642,580 | B1 | * | 11/2003 | Yun ............................... 257/350 |
| 6,897,909 | B2 | * | 5/2005 | Ochiai et al. .................... 349/43 |

(Continued)

FOREIGN PATENT DOCUMENTS

| | | |
|---|---|---|
| KR | 1020040000980 | 1/2004 |
| KR | 1020050041355 | 5/2005 |
| KR | 1020050053281 | 6/2005 |

*Primary Examiner* — Lucy Chien
*Assistant Examiner* — Paisley L Arendt
(74) *Attorney, Agent, or Firm* — H.C. Park & Associates, PLC

(57) ABSTRACT

An array substrate includes a base substrate, a plurality of storage voltage lines, a plurality of connecting lines, and a common voltage applying section. Pixels are formed in regions defined by a plurality of gate lines extending along a first direction and data lines extending along a second direction. The connecting lines are connected to the storage voltage lines that are formed on adjacent pixels of pixels arranged in the second direction. The common voltage applying section applies a common voltage to the storage voltage lines that are formed in a portion of the pixels arranged in the first direction. Thus, a substantially uniform current may be applied to the display area to decrease the distortion of the common voltage, thereby increasing a liquid crystal display device's display quality.

23 Claims, 13 Drawing Sheets

U.S. PATENT DOCUMENTS

| | | | |
|---|---|---|---|
| 6,903,717 B2* | 6/2005 | Takahashi et al. | 345/100 |
| 7,061,553 B2* | 6/2006 | Taguchi et al. | 349/39 |
| 7,113,242 B2* | 9/2006 | Kim et al. | 349/139 |
| 7,453,539 B2* | 11/2008 | Matsuoka et al. | 349/141 |
| 2003/0133054 A1* | 7/2003 | Taguchi et al. | 349/38 |
| 2004/0227894 A1* | 11/2004 | Kim et al. | 349/145 |

* cited by examiner

FIG. 4
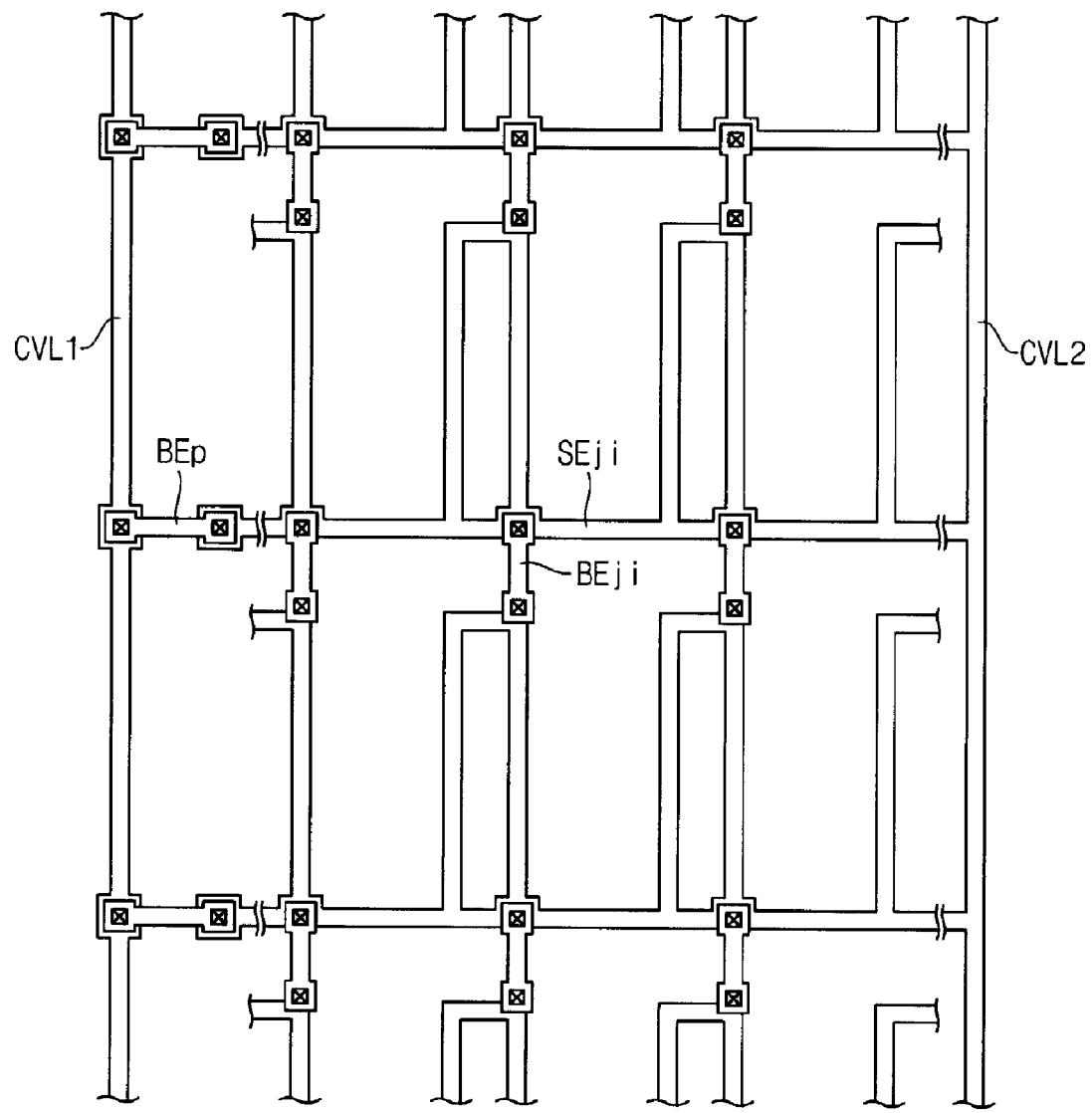
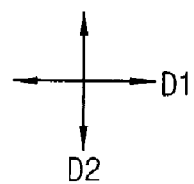

ARRAY SUBSTRATE HAVING STORAGE VOLTAGE LINES, LIQUID CRYSTAL DISPLAY PANEL HAVING THE ARRAY SUBSTRATE AND LIQUID CRYSTAL DISPLAY DEVICE HAVING THE LIQUID CRYSTAL DISPLAY PANEL

CROSS-REFERENCE TO RELATED APPLICATIONS

This application claims priority from and the benefit of Korean Patent Application No. 10-2005-0081975, filed on Sep. 3, 2005, which is hereby incorporated by reference for all purposes as if fully set forth herein.

BACKGROUND OF THE INVENTION

1. Field of the Invention

The present invention relates to an array substrate, a liquid crystal display (LCD) panel having the array substrate and an LCD device having the LCD panel. More particularly, the present invention relates to an array substrate with enhanced display quality, an LCD panel having the array substrate and an LCD device having the LCD panel.

2. Discussion of the Background

Generally, various electronic devices such as monitors, notebook computers, television sets, cellular phones, etc., are required to be thin and lightweight. Hence, various flat panel display devices, which have better characteristics than conventional cathode ray tubes (CRT), have been developed.

A liquid crystal display (LCD) device displays an image using optical and electrical properties of liquid crystals. The LCD device has advantageous characteristics such as it may be made lightweight, and it has relatively low power consumption and driving voltage.

Since LCD devices have been widely applied to various information-processing devices, such as, for example, notebook computers, computer monitors, television sets, and cellular phones, the need for improved display quality has increased.

The LCD device includes an LCD panel, which includes an array substrate, an opposite substrate, and a liquid crystal layer interposed between the array substrate and the opposite substrate. The array substrate includes a plurality of data lines and a plurality of gate lines that cross each other and define a plurality of pixels.

Each pixel includes a switching element, a liquid crystal (LC) capacitor, and a storage capacitor. A first electrode of the LC capacitor may be a pixel electrode that is electrically connected to a drain electrode of the switching element, and a second electrode of the LC capacitor may be a common electrode that is formed on the opposite substrate. A first electrode of the storage capacitor may be the pixel electrode, and a second electrode of the storage capacitor may be a common electrode that is formed on the array substrate.

When the gate signal that is applied to a gate line is applied to a gate electrode of the switching element, the switching element turns on. Then, the data signal that is applied to a data line is applied to the pixel electrode through the source electrode of the switching element.

Moreover, after applying the data signal to the pixel electrode, which is the first electrode of the storage capacitor and the first electrode of the LC capacitor, a uniform DC voltage may be applied to the second electrode of the storage capacitor in order to maintain a voltage level of the data signal. Therefore, charges corresponding to the data signal may be charged in the LC capacitor and the storage capacitor so that liquid crystals vary their arrangement in response to an electric field formed by the charges. Thus, an image is displayed using transmitted or reflected light through the liquid crystals.

However, the storage voltage line of the storage capacitor is electrically connected to the common voltage line in a first direction, and it is overlapped with the pixel electrode. Moreover, the second electrode of the storage capacitor, which is the common electrode of the array substrate, receives a common voltage from an external device through a common voltage line that is formed on the LCD panel in the second direction.

Therefore, the common voltage is applied to two end portions of the LCD panel through the common voltage line, and currents applied to various positions of the LCD panel may differ from each other due to an RC delay of the storage voltage line.

Accordingly, when a coupling defect is formed between the pixel electrode and the common electrode of the array substrate, a common voltage may be distorted at the end portions and a central portion of the LCD panel, thereby displaying a greenish image on the central portion of the LCD panel and deteriorating the LCD panel's image display quality.

SUMMARY OF THE INVENTION

Exemplary embodiments of the present invention provide an array substrate that may be capable of applying a substantially uniform current to a display region to decrease a distortion of a common voltage.

Exemplary embodiments of the present invention also provide a liquid crystal display (LCD) panel having the above-mentioned array substrate.

Exemplary embodiments of the present invention also provide an LCD device having the above-mentioned LCD panel.

Additional features of the invention will be set forth in the description which follows, and in part will be apparent from the description, or may be learned by practice of the invention.

An exemplary embodiment of the present invention discloses an array substrate including a base substrate, a plurality of storage voltage lines, a plurality of first connecting lines, and a common voltage applying section. The base substrate includes a display area and a peripheral area. The display area includes a plurality of pixels and a plurality of data lines. The pixels are formed in regions defined by a plurality of gate lines extending along a first direction and the data lines extending in a second direction. The peripheral area is outside the display area. The storage voltage lines are formed in each of the pixels. The first connecting lines are electrically connected to the storage voltage lines that are formed on adjacent pixels of the pixels that are arranged in the second direction. The common voltage applying section is formed in the peripheral area to apply a common voltage to the storage voltage lines that are formed on a portion of the pixels arranged in the first direction. The common voltage applying section may include a first common voltage line and a power supply line, the power supply line being wider than and electrically connected to the first common voltage line.

Another exemplary embodiment of the present invention discloses an LCD panel including a first substrate and a second substrate. The first substrate has a common electrode. The second substrate is combined with the first substrate to receive a liquid crystal layer. The second substrate includes a base substrate, a plurality of storage voltage lines, a plurality of first connecting lines, and a common voltage applying section. The base substrate includes a display area and a peripheral area. The display area includes a plurality of pixels and a plurality of data lines. The pixels are formed in regions defined by a plurality of gate lines extending in a first direction and the data lines extending in a second direction. The peripheral area is outside the display area. The storage voltage lines are formed in each of the pixels. The first connecting lines are electrically connected to the storage voltage lines that are formed on adjacent pixels of the pixels that are arranged in the second direction. The common voltage applying section is formed in the peripheral area to apply a common voltage to the storage voltage lines that are formed on a portion of the pixels arranged in the first direction.

Still another exemplary embodiment of the present invention discloses an LCD device including a backlight assembly and a display panel assembly. The backlight assembly generates a light. The display panel assembly has a first substrate, a liquid crystal layer, and a second substrate that is combined with the first substrate to receive the liquid crystal layer. The display panel assembly displays an image using the light. The second substrate includes a base substrate, a plurality of storage voltage lines, a plurality of first connecting lines, and a common voltage applying section. The base substrate includes a display area and a peripheral area. The display area includes a plurality of pixels and a plurality of data lines. The pixels are formed in regions defined by a plurality of gate lines extending along a first direction and the data lines extending along a second direction. The peripheral area is outside the display area. The storage voltage lines are formed in each of the pixels. The first connecting lines are electrically connected to the storage voltage lines that are formed on adjacent pixels of the pixels that are arranged in the second direction. The common voltage applying section is formed in the peripheral area to apply a common voltage to the storage voltage lines that are formed on a portion of the pixels arranged in the first direction.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 4 is a plan view showing a storage voltage line of the array substrate of FIG. 2.

DETAILED DESCRIPTION OF THE ILLUSTRATED EMBODIMENTS

Figure 1:
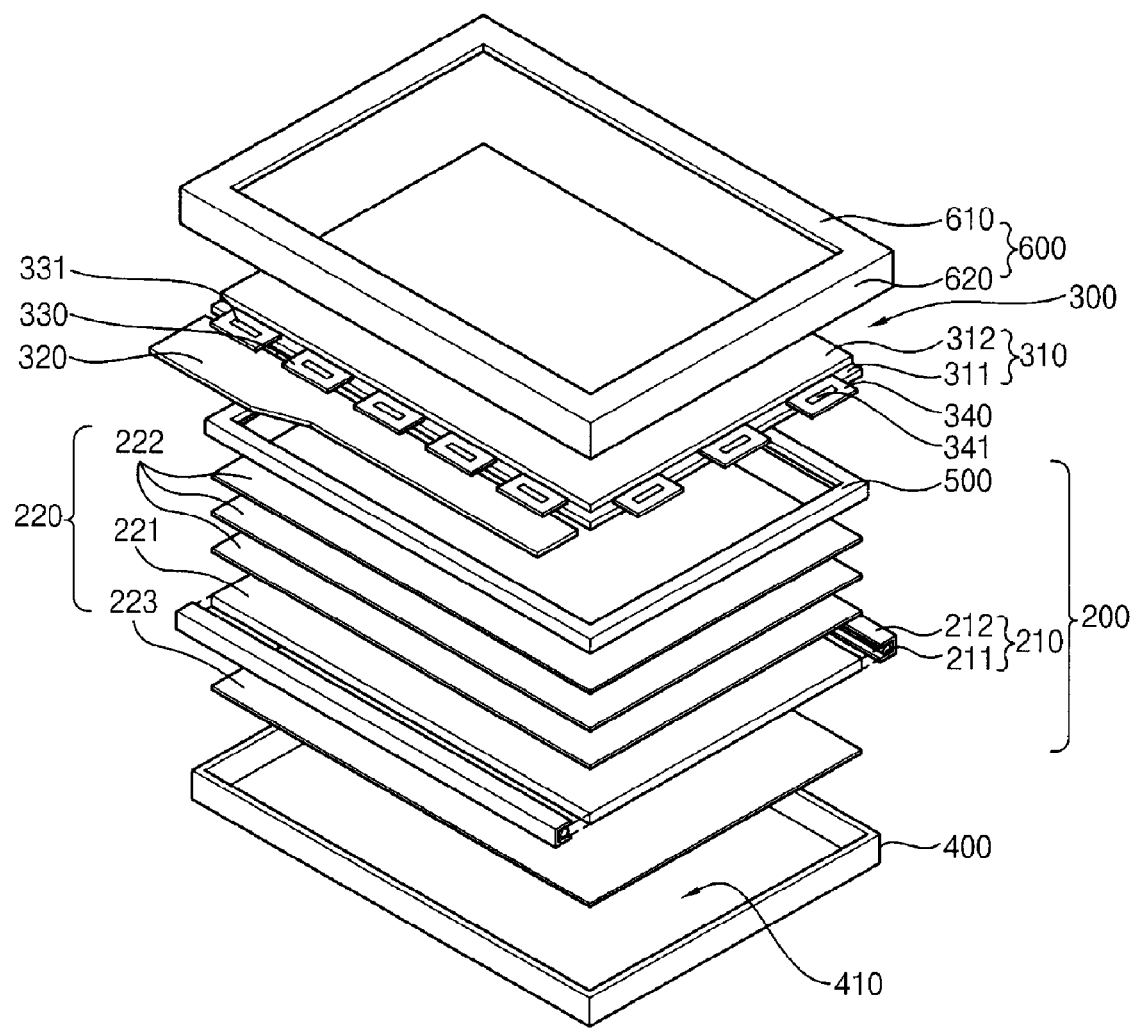
FIG. 1 is an exploded perspective view showing a liquid crystal display (LCD) device according to an exemplary embodiment of the present invention.

The invention is described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be described in detail with reference to the accompanying drawings.

FIG. 1 is an exploded perspective view showing a liquid crystal display (LCD) device according to an exemplary embodiment of the present invention.

Referring to FIG. 1, a liquid crystal display (LCD) device 100 according to an exemplary embodiment of the present invention includes a backlight assembly 200 and a display panel assembly 300.

The backlight assembly 200 includes a lamp unit 210 and an optical member 220.

The lamp unit 210 includes a lamp 211 that generates light and a lamp cover 212 that covers and protects the lamp 211 from external impact, external impurities, etc.

The lamp 211 may be a cold cathode fluorescent lamp (CCFL). For example, the lamp unit 210 may be disposed adjacent to a side of a light guide plate (LGP) 221. As another example, the lamp unit 210 may be disposed adjacent to opposite sides of the LGP 221 to enhance luminance characteristics of the backlight assembly 200.

Moreover, the lamp cover 212 may further include a lamp reflector to enhance luminance characteristics of the backlight assembly by reducing light leakage, which may occur when light is output from the lamp cover 212 in a direction away from the LGP 221.

The optical member 220 includes the LGP 221, a plurality of optical sheets 222, and a reflecting plate 223.

The LGP 221 guides the light generated from the lamp unit 210 to the optical sheets 222. A light guiding pattern (not shown) is formed on the LGP 221 to guide a path of the light output from the lamp unit 210.

The optical sheets 222 are disposed over the LGP 221. The optical sheets 222 enhance luminance characteristics of light that passes through the LGP 221, thereby providing the display panel assembly 300 with enhanced light. The optical sheets 222 may include a diffusing sheet or a polarizing sheet, etc., to enhance the light's luminance characteristics.

The reflecting sheet 223 is disposed below the LGP 221 to prevent a light leakage through a lower surface of the LGP 221. That is, light leaked through the lower surface of the LGP 221 may be reflected from the reflecting sheet 223 toward the LGP 221. Therefore, efficiency of the light and luminance characteristics of the backlight assembly 200 may be enhanced.

In FIG. 1, the reflecting plate 223 is a ridge type. Alternatively, the reflecting plate 223 may include various reflecting members such as a reflecting sheet, a reflecting layer formed on a first receiving container 400, etc. The reflecting sheet may be relatively thin.

In FIG. 1, the backlight assembly 200 is shown as an edge-illumination type. Alternatively, the backlight assembly 200 may be a direct-illumination type. The edge-illumination type backlight assembly includes an LGP 221 and at least one lamp that is disposed adjacent to one or two sides of the LGP 221. On the other hand, the direct-illumination type backlight assembly includes a plurality of lamps that are disposed under the display panel assembly 300.

The display panel assembly 300 is disposed over the backlight assembly 200. The display panel assembly 300 includes a liquid crystal display (LCD) panel 310 for displaying an image, a source printed circuit board (PCB) 320 for providing the LCD panel 310 with a driving signal, a data tape carrier package (TCP) section 330 for electrically connecting the LCD panel 310 to the source PCB 320, and a gate TCP section 340 that is electrically connected to the LCD panel 310.

The LCD panel 310 includes an array substrate 311, an opposite substrate 312, and a liquid crystal (LC) layer (not shown) interposed between the array substrate 311 and the opposite substrate 312.

The array substrate 311 includes a thin film transistor (TFT, not shown) that may be formed on a transparent glass substrate. The array substrate 311 may further include a plurality of TFTs that are arranged in a matrix. A source electrode and a gate electrode of the TFT are electrically connected to the data line and the gate line of the array substrate 311, respectively, and a drain electrode of the TFT is electrically connected to a pixel electrode. The pixel electrode may include an optically transparent and electrically conductive material.

A plurality of pixels is defined by the data and gate lines on the array substrate 311. Each pixel element includes a TFT, a LC capacitor, and a storage capacitor. First and second electrodes of the LC capacitor Clc are the pixel electrode and a common electrode that is formed on the opposite substrate, respectively. First and second electrodes of the storage capacitor Cst are the pixel electrode and a common electrode that is formed on the array substrate 311, respectively.

Moreover, the array substrate 311 further includes a common voltage line, a plurality of storage voltage lines, and a common voltage applying section. The common voltage line receives a common voltage from an external device, and the storage voltage lines define an auxiliary capacitance of the storage capacitor. Additionally, the common voltage applying section includes a plurality of contact points in a portion of the storage voltage line. The common voltage applying section may include a first common voltage line and a power supply line, the power supply line being wider than and electrically connected to the first common voltage line.

The above-mentioned display panel assembly is explained in more detail with reference to FIGS. 2 to 13.

The opposite substrate 312 faces the array substrate 311. For example, the opposite substrate 312 may include a color filter layer (not shown) that is formed on the opposite substrate 312 through a process of manufacturing a thin film. The color filter layer includes a red (R) pixel, a green (G) pixel and a blue (B) pixel. The opposite substrate 312 also includes a common electrode (not shown), which may include an optically transparent and electrically conductive material. The common electrode may be formed on the color filter layer.

The source PCB 320 generates a data driving signal and a gate driving signal, and it provides the data TCP section 330 with the data and gate driving signals.

The data TCP section 330 includes a data driver chip 331 for driving the data lines (not shown), and the gate TCP section 340 includes a gate driver chip 341 for driving the gate lines (not shown).

The array substrate 311 may further include a gate driver line (not shown) to apply the gate driving signal output from the source PCB 320 to the gate TCP section 340.

Moreover, the LCD device 100 may further include a first receiving container 400, a mold frame 500, and a second receiving container 600. The first receiving container 400 includes, for example, a bottom chassis, and the second receiving container 600 includes a top chassis.

The first receiving container 400 receives the backlight assembly 200. That is, the first receiving container 400 receives the lamp unit 210 and the optical member 220. Instead of the reflecting plate 223, the first receiving container 400 may include a reflecting layer that is coated on a bottom surface 410 of the first receiving container 400 to improve light reflectivity by reflecting light leaked through the lower surface of the LGP 221.

The mold frame 500 is disposed on the backlight assembly 200 to prevent drifting of the LCD panel 310, and the backlight assembly 200 is spaced apart from the LCD panel 310 by a predetermined interval.

The second receiving container 600 includes a Bessel section 610 and a side wall 620, and it secures the backlight assembly 200 to an upper portion of the display panel assembly 300.

The Bessel section 610 includes a substantially rectangular shape having an opening that exposes an effective display area of the LCD panel 310 in which an image is displayed. The side wall 620 extends from an end of the Bessel section 610 to secure the LCD panel 310 to the mold frame 500.

Figure 2:
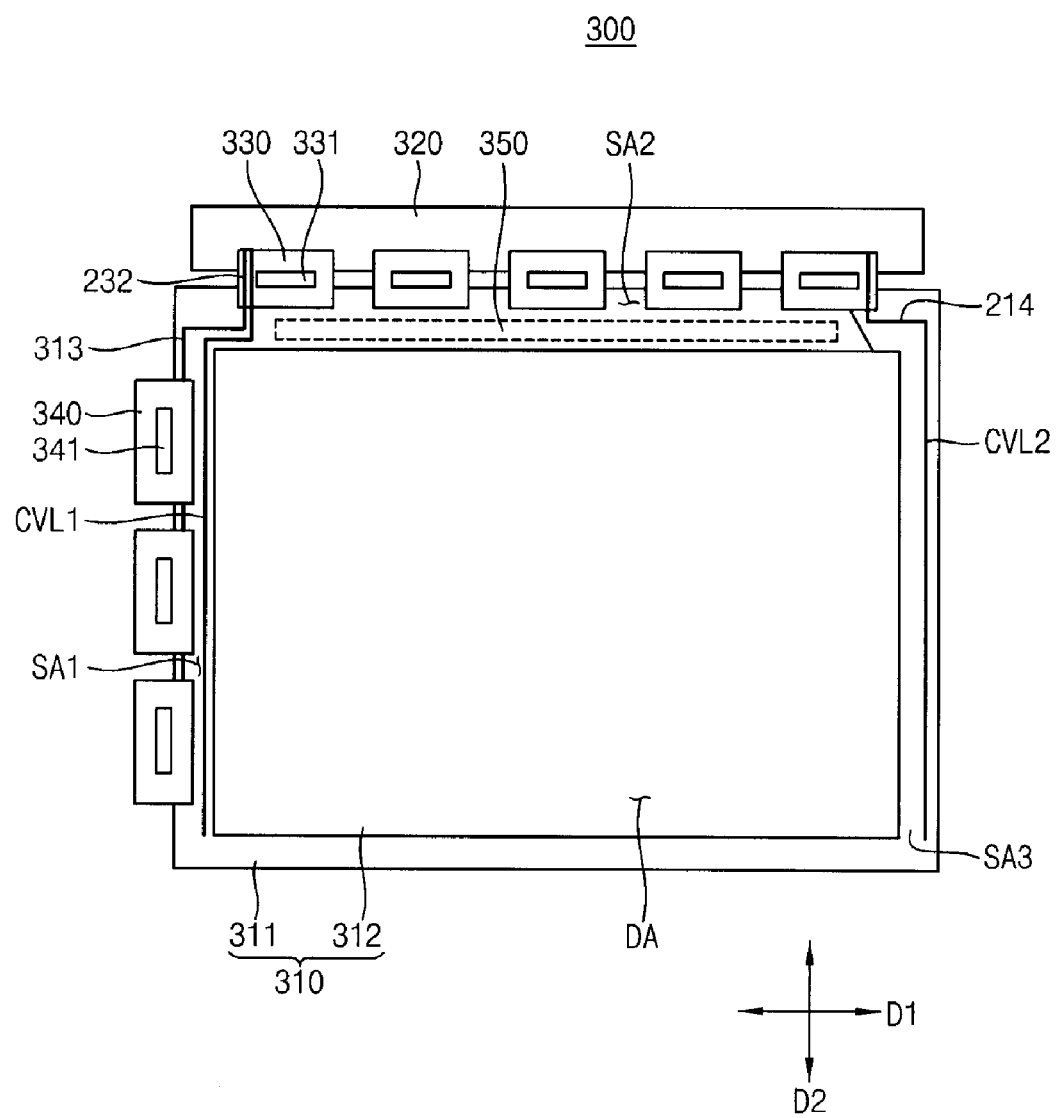
FIG. 2 is a plan view showing a display panel assembly according to an exemplary embodiment of the present invention.
Figure 3:
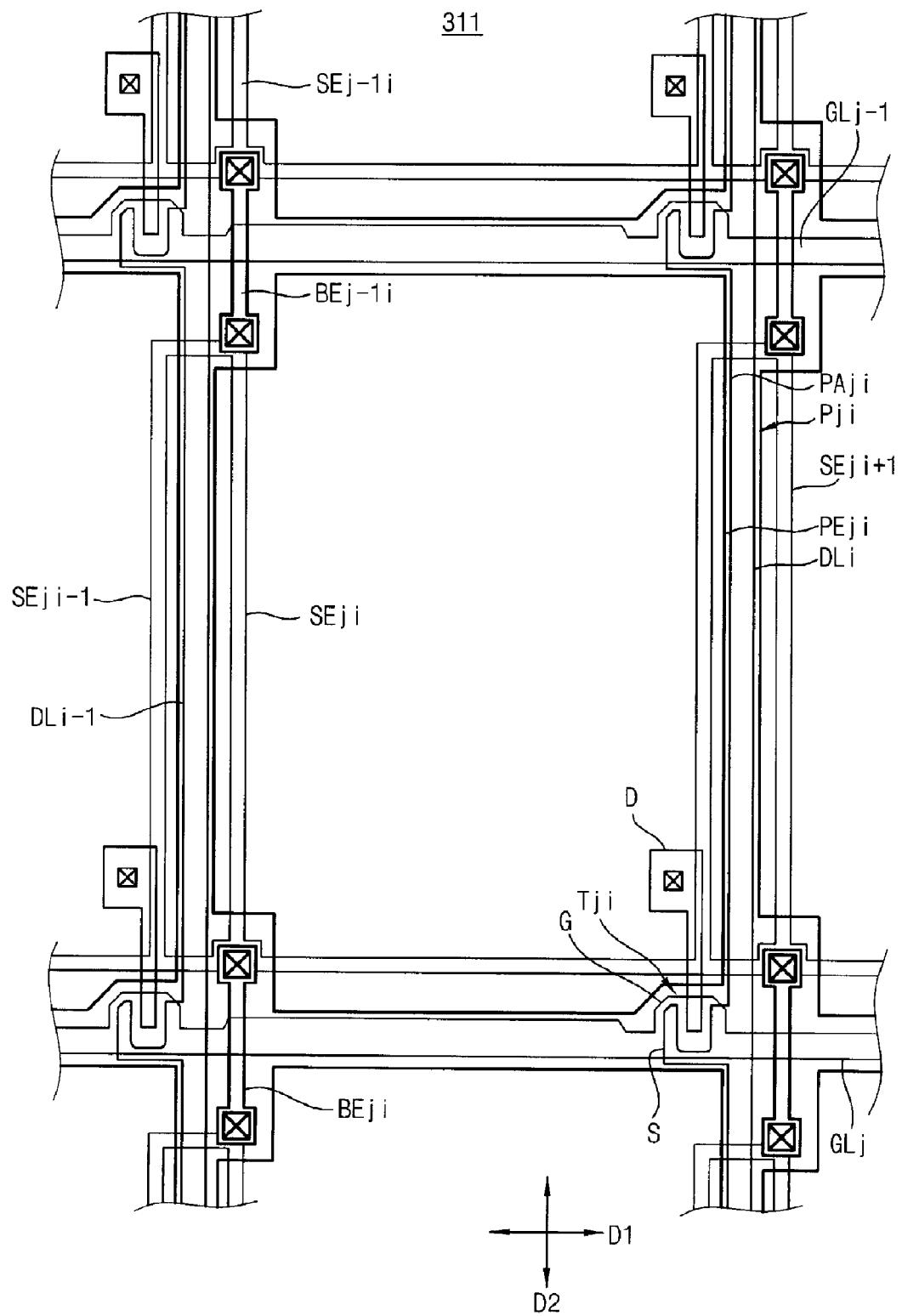
FIG. 3 is an enlarged plan view showing a portion of the array substrate of FIG. 2 according to an exemplary embodiment of the present invention.

FIG. 2 is a plan view showing a display panel assembly according to an exemplary embodiment of the present invention, FIG. 3 is an enlarged plan view showing a portion of the array substrate of FIG. 2, and FIG. 4 is a plan view showing a storage voltage line of the array substrate of FIG. 2.

Referring to FIG. 2 and FIG. 3, a display panel assembly 300 according to an exemplary embodiment of the present invention includes an LCD panel 310, a source PCB 320, a data TCP section 330, and a gate TCP section 340.

The LCD panel 310 includes an array substrate 311, an opposite substrate 312, and a LC layer (not shown) interposed between the array substrate 311 and the opposite substrate 312.

A plurality of pixels is formed on a base substrate of the array substrate 311. The pixels display an image and are arranged in a matrix shape. A (ji)-th pixel Pji among the pixels includes a j-th gate line GLj, an i-th data line DLi, a (ji)-th thin film transistor (TFT) Tji, and a (ji)-th pixel electrode PEji.

The j-th gate line GLj extends in a first direction D1, and the i-th data line DLi extends in a second direction D2 that is substantially perpendicular to the first direction D1. The j-th gate line GLj crosses the i-th data line DLi such that the j-th gate line GLj is electrically insulated from the i-th data line DLi.

The i-th data line DLi, the j-th gate line GLj, a (i−1)-th data line DLi−1, and a (j−1)-th gate line GLj−1 define a (ji)-th pixel area PAji. The (ji)-th TFT Tji and the (ji)-th pixel electrode PEji are arranged in the (ji)-th pixel area PAji.

The (ji)-th TFT Tji includes a gate electrode G, a source electrode S, and a drain electrode D. The gate electrode G of the (ji)-th TFT Tji diverges from the j-th gate line GLj, and the source electrode S of the (ji)-th TFT Tji diverges from the i-th data line DLi. The drain electrode D of the (ji)-th TFT Tji is electrically connected to the (ji)-th pixel electrode PEji. Accordingly, the (ji)-th TFT Tji provides the (ji)-th pixel electrode PEji with the data signal from the i-th data line DLi in response to the gate signal from the j-th gate line GLj.

Moreover, a common voltage is applied to the (ji)-th pixel Pji, which may further include a (ji)-th storage voltage line SEji that faces the (ji)-th pixel electrode PEji to define an auxiliary capacitor.

Referring to FIG. 3 and FIG. 4, the (ji)-th storage voltage line SEji extends in the first direction D1, which is substantially parallel with the j-th gate line GLj, and is electrically connected to a (j−1)-th storage voltage line SEji−1 and a (ji+1)-th storage voltage line SEji+1. Moreover, the (ji)-th storage voltage line SEji has a section (or branch) that extends in the second direction D2 so that it is substantially parallel with the i-th data line DLi.

The (ji)-th storage voltage line SEji and the j-th gate line GLj are formed from substantially the same metal layer. Examples of a metal that can be used for the (ji)-th storage voltage line SEji include aluminum (Al), aluminum alloy, chromium (Cr), molybdenum (Mo), etc. Moreover, the (ji)-th storage voltage line SEji may include, for example, a conductive material.

Alternatively, the (ji)-th storage voltage line SEji may be electrically isolated from the (j−1i)-th storage voltage line SEj−1i and the (j+1i)-th storage voltage line SEj+1i, which are adjacent to the (ji)-th storage voltage line SEji in the second direction D2.

The (j−1)-th gate line GLj−1 is formed between the (ji)-th storage voltage line SEji and the (j−1i)-th storage voltage line SEj−1i. Additionally, the j-th gate line GLj is formed between the (ji)-th storage voltage line SEji and the (j+(j+1i)-th storage voltage line SEj+1i.

Therefore, the (ji)-th pixel Pji may further include a (ji)-th first connecting line BEji that electrically connects the (ji)-th storage voltage line SEji to the (j+1i)-th storage voltage line SEj+1i.

In order to enhance the adhesion between the base substrate and the (ji)-th storage voltage line SEji, the (ji)-th storage voltage line SEji may include a double layered structure. For example, the double layered structure may include chromium (Cr)/an alloy of aluminum and neodymium (AlNd). When the (ji)-th storage voltage line SEji is formed by etching, an undercut may be formed in the Cr layer. In this case, electric charges may be stored in the undercut, and a horizontal line may be displayed.

Therefore, the (ji)-th first connecting line BEji may be electrically connected to the (ji)-th storage voltage line SEji to function as an electrical conduit of the charges. Thus, the charges in the undercut may dissipate through the (ji)-th first connecting line BEji, thereby preventing them from being stored in the undercut area.

The (ji)-th first connecting line BEji and the (ji)-th pixel electrode PEji are formed from substantially the same layer, so that the (ji)-th first connecting line BEji electrically connects the (ji)-th storage voltage line SEji to the (j+1i)-th storage voltage line SEj+1i. The (ji)-th first connecting line BEji is electrically isolated from the j-th gate line GLj. The (ji)-th first connecting line BEji is spaced apart and electrically isolated from the (ji)-th pixel electrode PEji.

The (j−1i)-th first connecting line BEj−1i electrically connects the (ji)-th storage voltage line SEji to the (j−1i)-th storage voltage line SEj−1i, and the (ji)-th first connecting line BEji electrically connects the (ji)-th storage voltage line SEji to the (j+1i)-th storage voltage line SEj+1i. Accordingly, the storage voltage line SE may be formed on the array substrate 311 in a matrix shape, and it may be electrically interconnected in the first and second directions D1 and D2.

Moreover, the array substrate 311 may further include a common voltage line CVL that is electrically connected to the storage voltage line SE. The common voltage line CVL applies a common voltage Vcom to the storage voltage line SE.

A portion of the common voltage line CVL and the storage voltage line SE are formed from substantially the same layer. The common voltage line CVL is formed in a peripheral area SA that surrounds a display area DA defined by the pixels.

The common voltage line CVL includes a first common voltage line CVL1 and a second common voltage line CVL2. The first common voltage line CVL1 is formed in a first peripheral area SA1 of the peripheral area SA. The second common voltage line CVL2 is formed in a third peripheral area SA3 of the peripheral area SA. The third peripheral area SA3 faces the first peripheral area SA1.

In order to electrically isolate the first common voltage line CVL1 from the storage voltage line SE, the first common voltage line CVL1 is formed of a different layer than the storage voltage line SE. The gate TCP section 340 is formed in the first peripheral area SA1, and the gate line GL is electrically connected to the gate TCP section 340. Therefore, there is provided a second connecting line BEp so that the first common voltage line CVL1 and the storage voltage line SE are electrically connected to each other through the second connecting line BEp.

The second common voltage line CVL2 is formed in the third peripheral area SA3, and the second common voltage line CVL2 and the storage voltage line SE are formed from substantially the same layer. The second common voltage line CVL2 is electrically connected to the storage voltage line SE, and the second common voltage line CVL2 may contact the storage voltage line SE.

In FIG. 2 and FIG. 4, the first and second common voltage lines CVL1 and CVL2 are formed in the first and third peripheral areas SA1 and SA3 of the array substrate 311, respectively, and are electrically connected to opposite ends of the storage voltage line SE, respectively. Therefore, each of the first and second common voltage lines CVL1 and CVL2 supplies a current of a constant intensity to the storage voltage line SE regardless of an RC delay that changes in accordance with a position of the storage voltage line SE. Alternatively, either the first common voltage line CVL1 or the second common voltage line CVL2 may be formed on the array substrate 311.

Referring back to FIG. 2, the source PCB 320 outputs the data driving signal that drives the data driver chip 331 mounted on the data TCP section 330 and the gate driving signal that drives the gate driver chip 341 mounted on the gate TCP section 340. The source PCB 320 is electrically connected to the array substrate 311 through the data TCP section 330.

The data TCP section 330 includes a plurality of data TCPs to drive 'm' number of data lines DL that are grouped into a plurality of blocks. The data TCPs are mounted on the second peripheral area SA2 of the peripheral area SA.

At least one of the data TCPs among the data TCP section 330 includes a metal line 232 to transfer the gate driving signal from the source PCB 320 to the array substrate 311. An auxiliary metal line 313, which is electrically connected to the metal line 232, is formed on the array substrate 311. The auxiliary metal line 313 transfers the gate driving signal to the gate TCP section 340.

The gate TCP section 340 includes a plurality of gate TCPs to drive 'n' number of gate lines GL that are grouped into a plurality of blocks. The gate TCPs are mounted on the first peripheral area SA1 of the peripheral area SA.

Moreover, the LCD panel 310 according to an exemplary embodiment of the present invention may further include a common voltage applying section 350. The common voltage applying section 350 applies the common voltage Vcom to the storage voltage line SE so that a substantially uniform current may be applied the storage voltage line SE regardless of the storage voltage line's position. That is, the common voltage applying section 350 applies the common voltage Vcom to the storage voltage line SE so that the substantially uniform current may be applied to the storage voltage line SE regardless of a distance from the first common voltage line CVL1, which is formed in the first peripheral area SA1, or a distance from the second common voltage line CVL2, which is formed in the third peripheral area SA3.

The common voltage applying section 350 applies the common voltage Vcom from an external device to the storage voltage line SE through a plurality of contact points. The contact points are formed between the common voltage applying section 350 and a portion of the storage voltage line SEji that is formed in the pixel Pji. The common voltage applying section 350 will described below.

Figure 5:
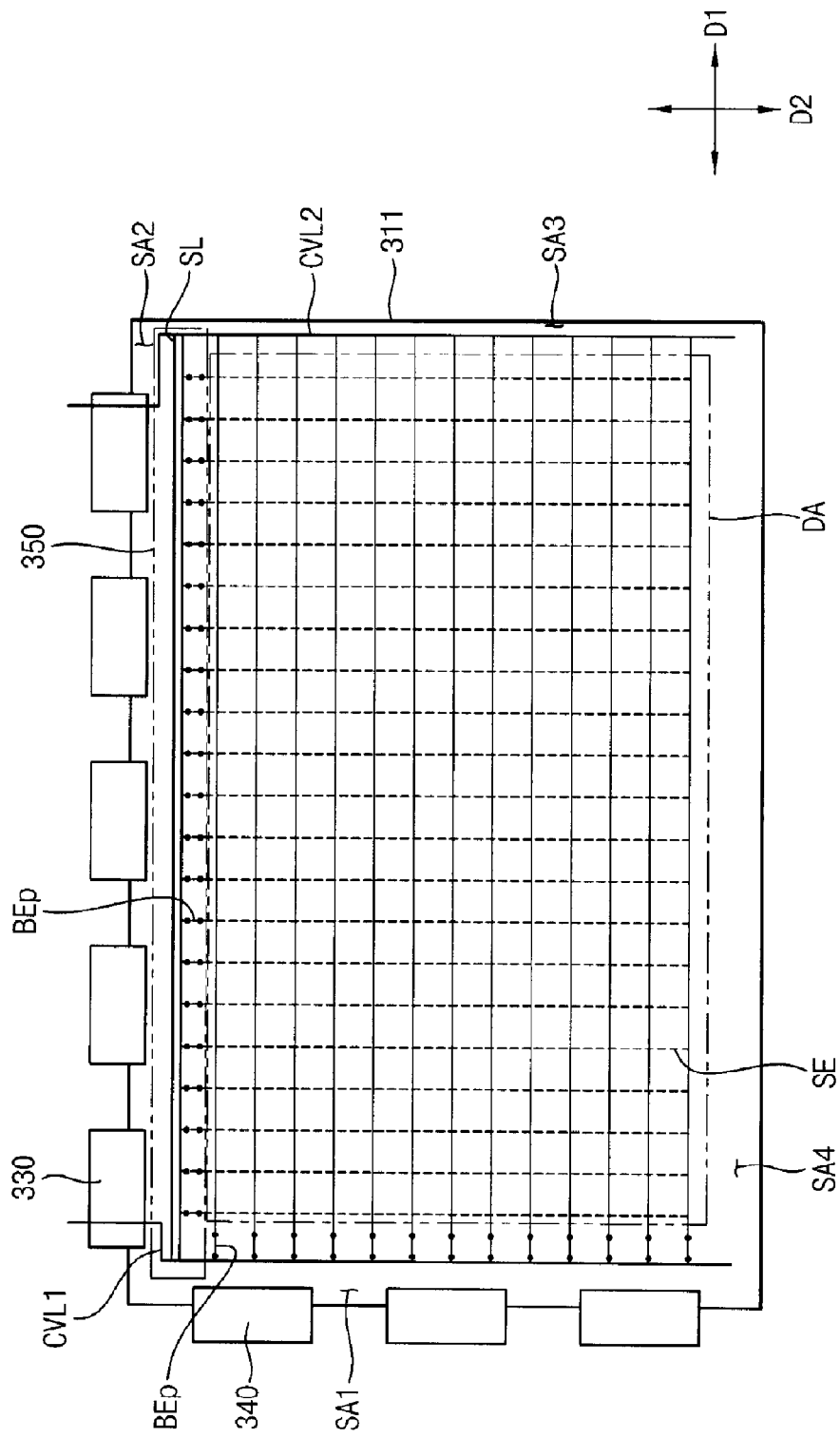
FIG. 5 is a plan view showing a common voltage applying section according to an exemplary embodiment of the present invention.
Figure 6:
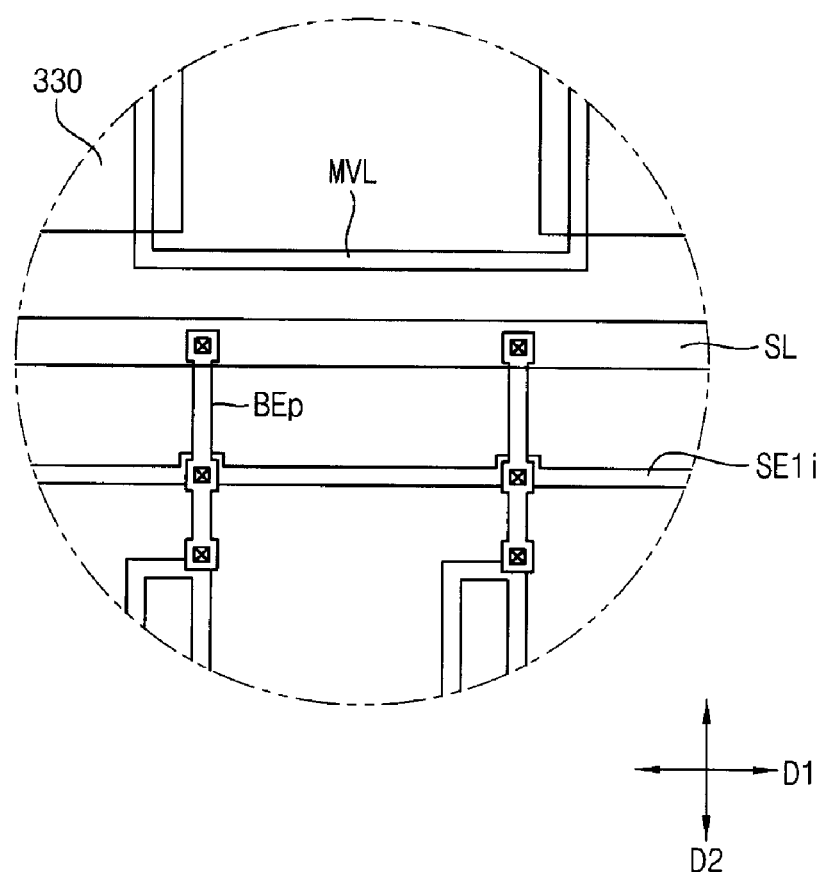
FIG. 6 is an enlarged plan view showing a portion of the common voltage applying section of FIG. 5.

FIG. 5 is a plan view showing a common voltage applying section according to an exemplary embodiment of the present invention. FIG. 6 is an enlarged plan view showing a portion of the common voltage applying section of FIG. 5.

Referring to FIG. 5 and FIG. 6, a common voltage applying section 350 is formed in a second peripheral area SA2 of a peripheral area SA that surrounds a display area DA of an array substrate 311.

The common voltage applying section 350 is arranged along a first direction D1 in the second peripheral area SA2. The common voltage applying section 350 includes a power supply line SL. The power supply line SL is electrically connected to the first common voltage line CVL1, which is formed in the first peripheral area SA1, and the second common voltage line CVL2, which is formed in the third peripheral area SA3.

The power supply line SL may be formed wider than the storage voltage line SE, which is arranged in the display area DA. Therefore, the power supply line SL may have a larger cross-section so that its impedance is less than that of the storage voltage line SE. Therefore, a current loss of the current flowing from the common voltage lines CVL1 and CVL2 to the power supply line SL may be decreased. The power supply line SL may be electrically connected with the storage voltage line SE through contacting with the second connecting line BEp.

The power supply line SL extends in a first direction D1. The power supply line SL is electrically connected to a (1i)-th storage voltage line SE1i of the storage voltage line SE through the second connecting line BEp.

Alternatively, the power supply line SL may be electrically connected to the (1i)-th storage voltage line SEL1i, which may be formed from substantially the same layer, through a second power supply line that extends from the first power supply line. In this case, the first power supply line may be formed substantially in parallel with the first direction D1, and the second power supply line may be formed substantially in parallel with the second direction D2.

In another exemplary embodiment, the power supply line SL may be formed in a fourth peripheral area SA4 that faces the second peripheral area SA2. Furthermore, the power supply line SL may be formed in the second peripheral area SA2 and the fourth peripheral area SA4.

As described above, the common voltage Vcom may be constantly applied to the storage voltage lines SE that are formed in each pixel Pji through the power supply line SL. Therefore, a distortion of the common voltage Vcom, which is induced by a current difference between pixel elements Pji that are spaced apart from each of the common voltage lines CVL1 and CVL2 at various distances, may be decreased.

Figure 7:
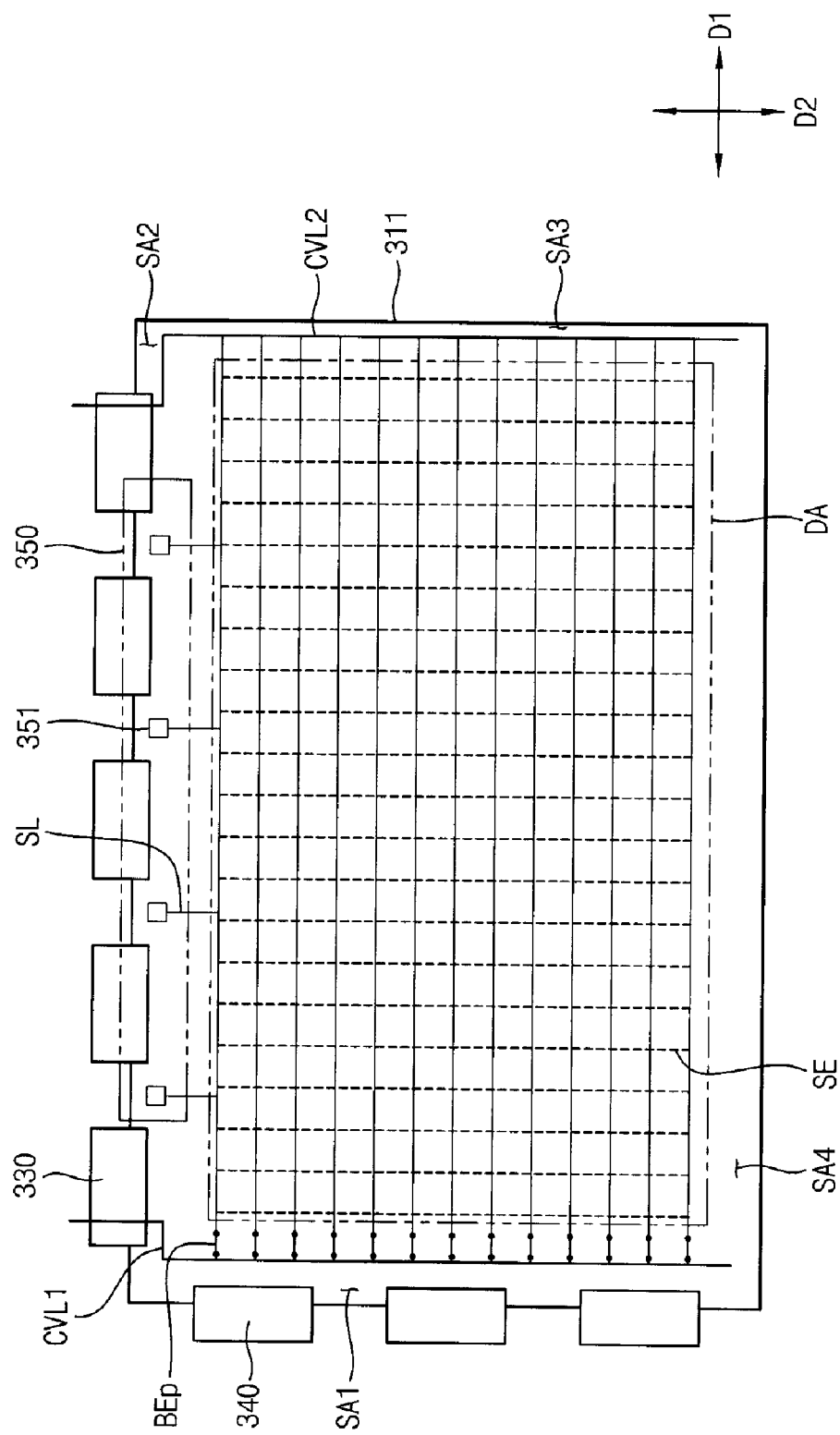
FIG. 7 is a plan view showing a common voltage applying section according to another exemplary embodiment of the present invention.
Figure 8:
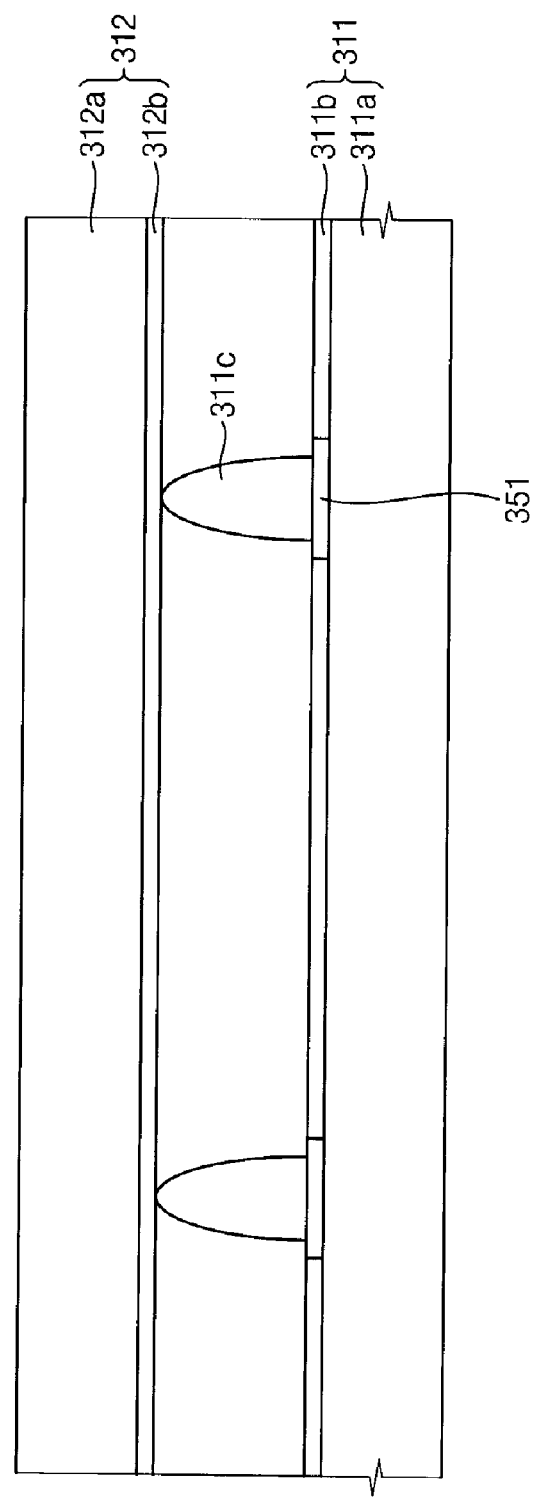
FIG. 8 is a cross-sectional view showing the common voltage applying section of FIG. 7.
Figure 9:
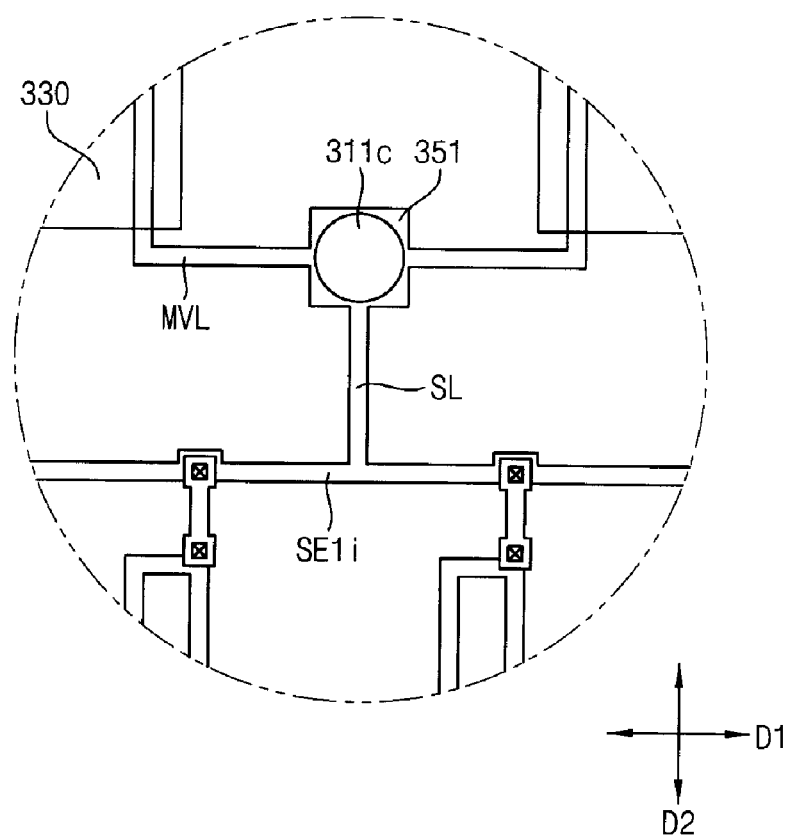
FIG. 9 is an enlarged plan view showing a portion of the common voltage applying section of FIG. 7.

FIG. 7 is a plan view showing a common voltage applying section according to another exemplary embodiment of the present invention, FIG. 8 is a cross-sectional view showing the common voltage applying section of FIG. 7, and FIG. 9 is an enlarged plan view showing a portion of the common voltage applying section of FIG. 7.

Referring to FIG. 7, FIG. 8, and FIG. 9, a common voltage applying section 350 is arranged in a second peripheral area SA2 of a peripheral area SA. The peripheral area SA surrounds a display area DA that is formed on an array substrate 311.

The common voltage applying section 350 includes a power supply line SL extending from the conductive connecting member 351 in a second direction D2.

The conductive connecting member 351 provides a common electrode 312b, which is formed on an opposite substrate 312 facing the array substrate 311, with a common voltage Vcom from an external device.

A contact member 311c is arranged on the conductive connecting member 351. The contact member 311c is electrically connected to the common electrode 311b of the array substrate 311 and the common electrode 312b of the opposite substrate 312. One end of the contact member 311c is electrically connected to the common electrode 311b, which is arranged on the base substrate 311a of the array substrate 311, and another end of the contact member 311c is electrically connected to the common electrode 312b, which is arranged on the base substrate 312a of the opposite substrate 312. Moreover, the conductive connecting member 351 is electrically connected to a voltage line that receives the common voltage Vcom.

When one common voltage is applied to the array substrate 311 and the opposite substrate 312, the conductive connecting member 351 receives the common voltage Vcom having substantially the same level as the common voltage applied to the common voltage lines CVL1 and CVL2, which are formed in the first and third peripheral area SA1 and SA3 of the array substrate 311, respectively. That is, the common electrode 311b of the array substrate 311 has substantially the same level as the common electrode 312b of the opposite substrate 312.

Moreover, a plurality of power supply lines SL defines a plurality of electric contact points with the storage voltage line SE that is formed in a portion of pixels among the pixels Pji arranged in the first direction in the display area DA. The power supply line SL extends from the conductive connecting member 351 in the second direction D2. Therefore, a first end of the power supply line SL defines an electric contact point with the storage voltage line SE, and a second end of the power supply line SL defines an electric contact point with the conductive connecting member 351.

A current corresponding to the common voltage Vcom applied to the conductive connecting member 351 is applied to the storage voltage line SE through the power supply line SL.

A plurality of conductive connecting members 351 may be formed on the array substrate 311. Each of a plurality of power supply lines SL may be formed in each of the conductive connecting members 351, and may define a plurality of electric contact points with the storage voltage line SE.

Moreover, the power supply line SL may be formed on a portion of the conductive connecting member 351 to form a plurality of electric contact points with the storage voltage line SE. The power supply line SL may be electrically connected to an (1i)-th storage voltage line SELi among the storage voltage line SE.

As described above, a plurality of voltage applying points is formed on a plurality of points of the storage voltage line SE formed on the portion of the pixels arranged in the first direction D1 using the conductive connecting member 351 and the power supply line SL. A substantially uniform current may be constantly applied to the storage voltage line SE.

Therefore, a distortion of the common voltage Vcom, which is induced by a current difference between pixels Pji that are spaced apart from each of the common voltage lines CVL1 and CVL2 at various distances, may be prevented.

Figure 10:
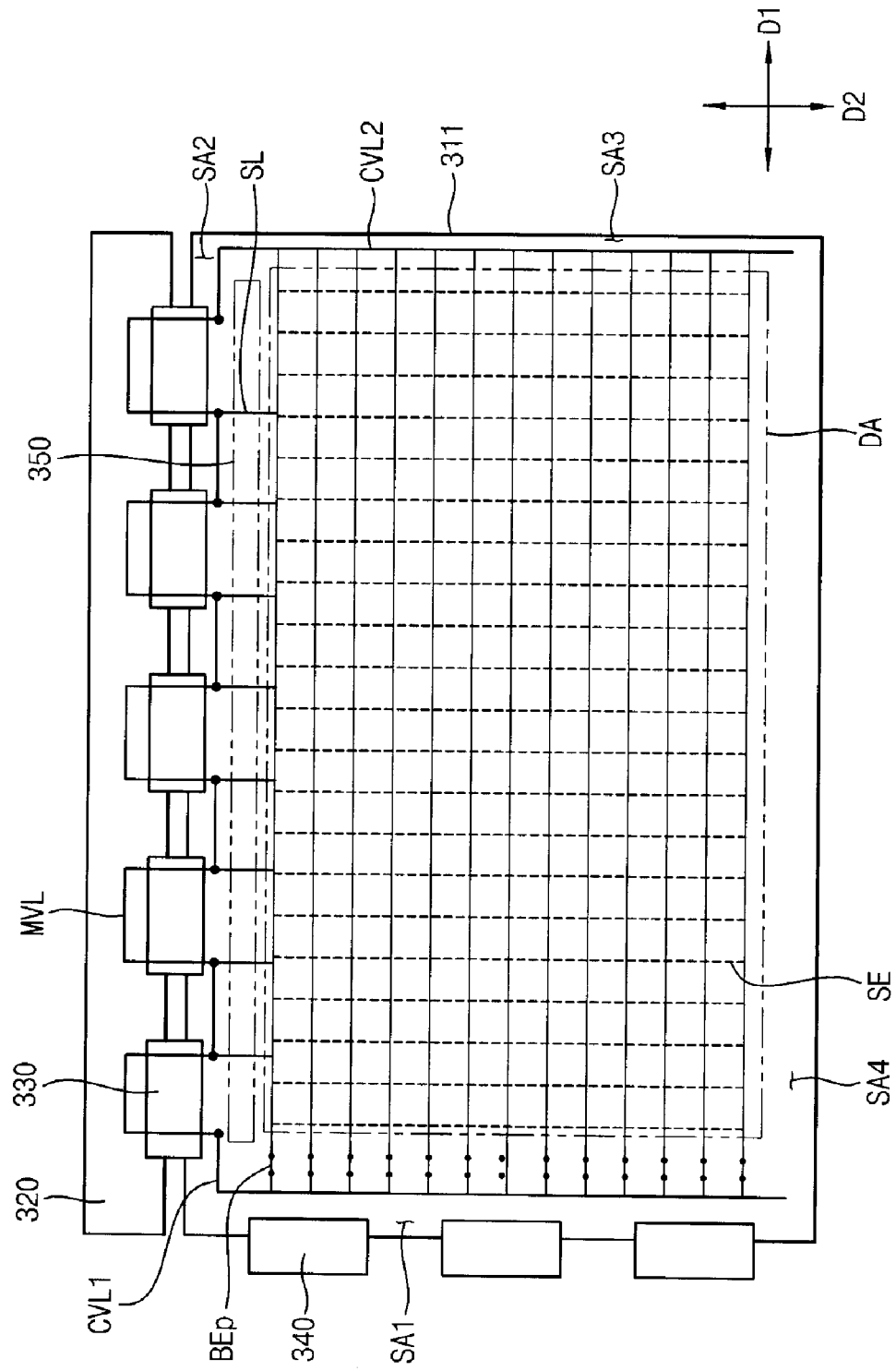
FIG. 10 is a plan view showing a common voltage applying section according to another exemplary embodiment of the present invention.
Figure 11:
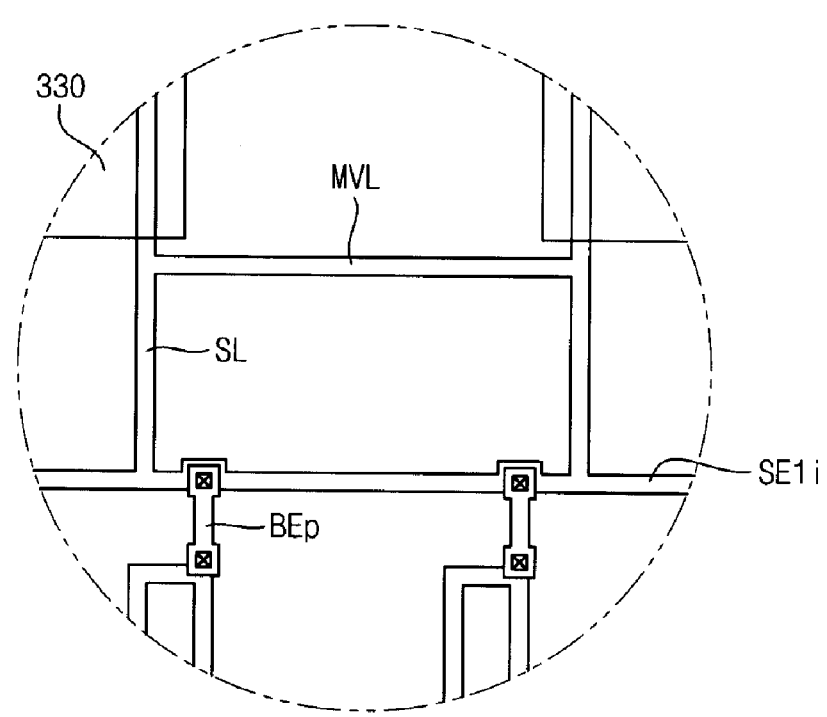
FIG. 11 is an enlarged plan view showing a portion of the common voltage applying section of FIG. 10.

FIG. 10 is a plan view showing a common voltage applying section according to still another exemplary embodiment of the present invention, and FIG. 11 is an enlarged plan view showing a portion of the common voltage applying section of FIG. 10.

Referring to FIG. 10 and FIG. 11, a common voltage applying section 350 is arranged in a second peripheral area SA2 of a peripheral area SA that surrounds a display area DA of an array substrate 311.

The common voltage applying section 350 and a power supply line SL are formed from substantially the same layer in the second peripheral area SA2. The power supply line SL extends from a main voltage line MVL formed in the second peripheral area SA2 to provide the conductive connecting member 351 (shown in FIG. 7) with a common voltage Vcom.

The main voltage line MVL is electrically connected to the conductive connecting member 351 via the source PCB 320 (see FIG. 2) and the data TCP 330 to provide the conductive connecting member 351 with the common voltage Vcom.

Therefore, when one common voltage is applied to the array substrate 311 and the opposite substrate 312 (shown in FIG. 8), the main voltage line MVL receives the common voltage Vcom having substantially the same level as the common voltage applied to the common voltage lines CVL1 and CVL2, which are formed in the first and third peripheral areas SA1 and SA3 of the array substrate 311, respectively.

Furthermore, a first end of the power supply line SL and a storage voltage line SE, which is formed in the display area DA, define an electric contact point. A second end of the power supply line SL extends from the main voltage line MVL. Hence, a current that flows through the main voltage line MVL is applied to the storage voltage line SE through the power supply line SL. A plurality of power supply lines SL may be formed on the array substrate 311, and they may be spaced apart from each other by a constant interval to decrease a loss of current induced by an impedance of the storage voltage line SE and to provide the storage voltage line SEji formed in each pixel with a substantially uniform current.

As described above, a plurality of voltage applying points is formed in a plurality of storage voltage lines SE using the power supply line SL, and a substantially uniform current may be applied to various positions of the storage voltage lines SE. Therefore, a distortion of the common voltage Vcom, which is induced by a current difference between pixels Pji that are spaced apart from each of the common voltage lines CVL1 and CVL2 at a relatively long distance, may be decreased.

Figure 12:
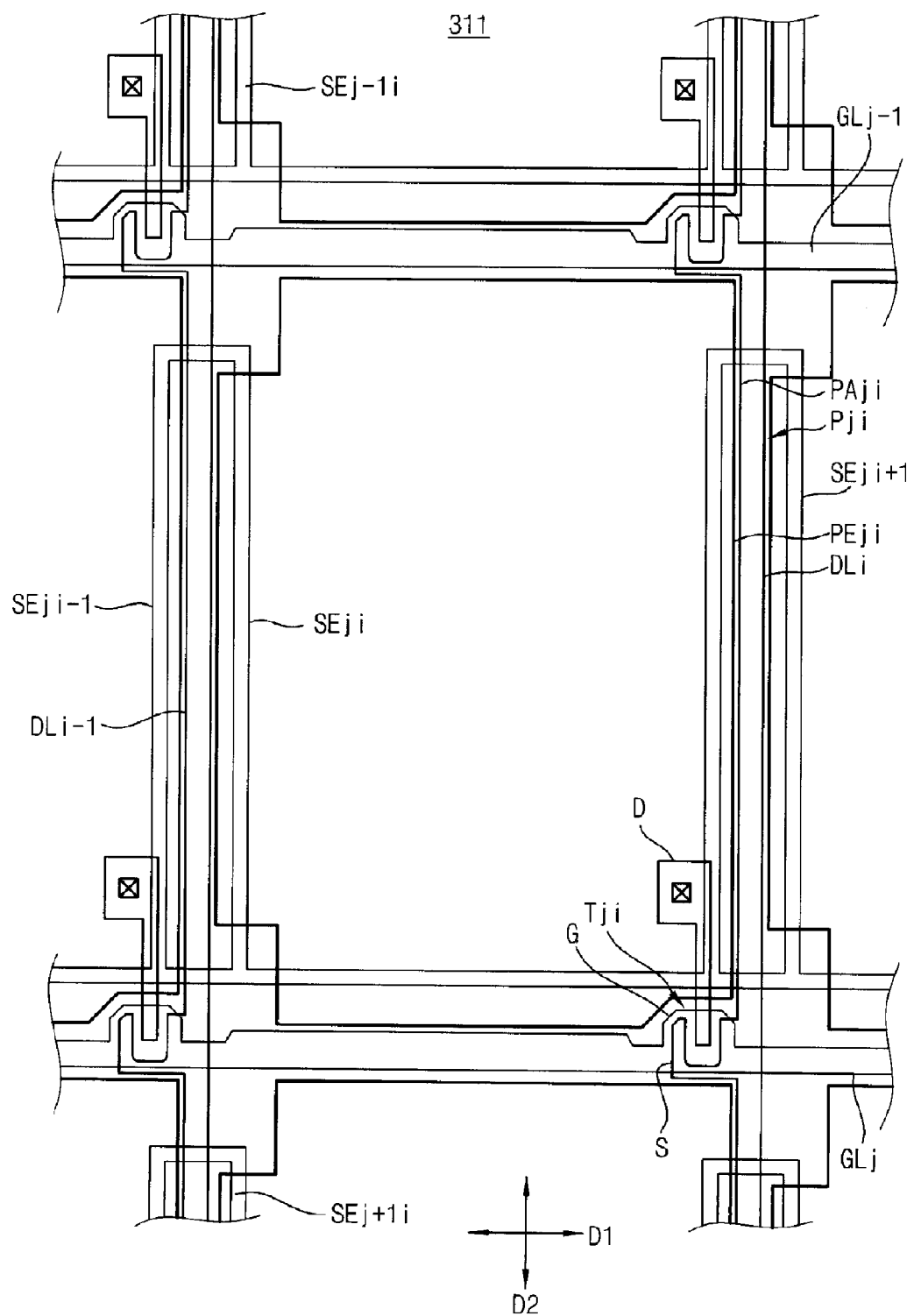
FIG. 12 is an enlarged plan view showing a portion of the array substrate of FIG. 2 according to an exemplary embodiment of the present invention.
Figure 13:
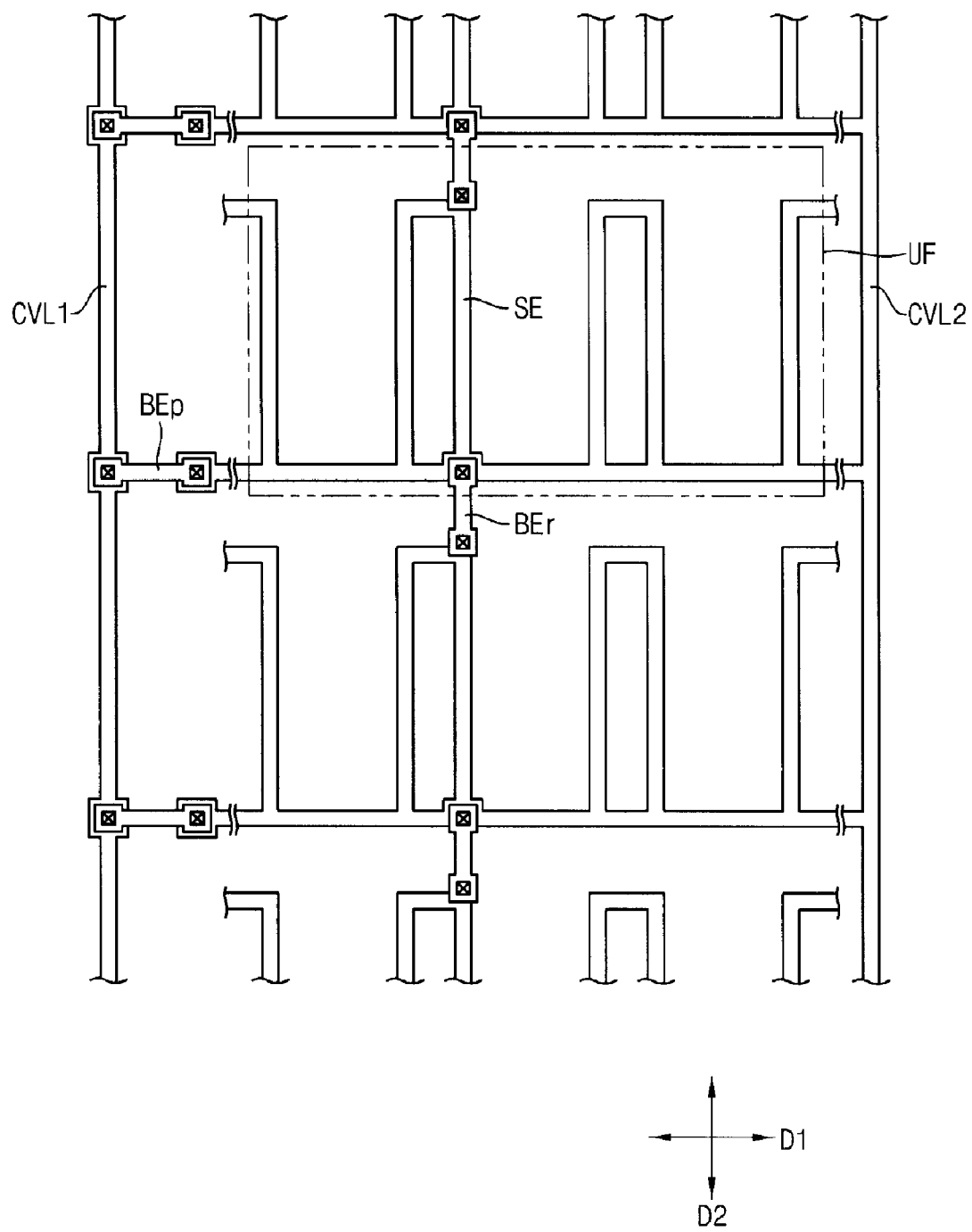
FIG. 13 is a plan view showing a storage voltage line of the array substrate of FIG. 12.

FIG. 12 is an enlarged plan view showing a portion of the array substrate of FIG. 2 according to an exemplary embodiment of the present invention, and FIG. 13 is a plan view showing a storage voltage line of the array substrate of FIG. 12.

Referring to FIG. 12 and FIG. 13, an array substrate 311 according to another exemplary embodiment of the present invention includes a plurality of pixels that display an image and are arranged in a matrix. A (ji)-th pixel Pji among the pixels includes aj-th gate line GLj, an i-th data line DLi, a (ji)-th TFT Tji and a (ji)-th pixel electrode PEji.

The j-th gate line GLj extends in first direction D1, and the i-th data line DLi extends in second direction D2. The i-th data line DLi is electrically insulated from the j-th gate line GLj and crosses the j-th gate line GLj.

The i-th data line DLi, the j-th gate line GLj, a (i–1)-th data line DLi–1, and a (j–1)-th gate line GLj–1 define a (ji)-th pixel area PAji. The (i–1)-th data line DLi–1 and the (–1)-th gate line GLj–1 are adjacent to the i-th data line DLi and the j-th gate line GLj, respectively. The (ji)-th TFT Tji and the (ji)-th pixel electrode PEji are formed in the (ji)-th pixel area PAji.

A gate electrode G of the (ji)-th TFT Tji diverges from the j-th gate line GLj, and a source electrode S of the (ji)-th TFT Tji diverges from the i-th data line DLi. A drain electrode D of the (ji)-th TFT Tji is electrically connected to the (ji)-th pixel electrode PEji. Therefore, the (ji)-th TFT Tji outputs a data signal applied from the i-th data line DLi to the (ji)-th pixel electrode PEji in response to a gate signal applied to the gate electrode G of the (ji)-th TFT Tji.

Moreover, the (ji)-th pixel Pji may further include a (ji)-th storage voltage line SEji that receives a common voltage Vcom. The (ji)-th storage voltage line SEji defines an auxiliary capacitor facing the (ji)-th pixel electrode PEji.

The (ji)-th storage voltage line SEji extends in first direction D1 substantially in parallel with the j-th gate line GLj, and it is electrically connected to the (ji–1)-th storage voltage line SEji–1 and a (ji+1)-th storage voltage line SEji+1, which are adjacent to the each other in the first direction D1. Moreover, a portion of the (ji)-th storage voltage line SEji may diverge in the second direction D2 so that it is substantially in parallel with the i-th data line DLi.

For example, the (ji)-th storage voltage line SEji may include aluminum (Al), aluminum alloy, chromium (Cr), molybdenum (Mo), etc. These may be used alone or in combination. The (ji)-th storage voltage line SEji may be formed from substantially the same layer as the j-th gate line GLj. Alternatively, the (ji)-th storage voltage line SEji may include various metals or various electrically conductive material.

The (ji)-th storage voltage line SEji is electrically disconnected from the (j–1i)-th storage voltage line SEj–1i and the (j+1i)-th storage voltage line SEj+1i, which are adjacent to each other in the second direction D2. When the (ji)-th storage voltage line SEji and the j-th gate line GLj are formed from substantially the same layer, the (j–1)-th gate line GLj–1 is formed between the (ji)-th storage voltage line SEji and the (j–1i)-th storage voltage line SEj–1i, and the j-th gate line GLj is formed between the (ji)-th storage voltage line SEji and the (j+1i)-th storage voltage line SEj+1i.

For example, the (ji)-th storage voltage line SEji may have a triple layered structure of molybdenum/aluminum/molybdenum (Mo/Al/Mo) so that an undercut may not be formed during a process of forming the (ji)-th storage voltage line SEji, thereby decreasing a ticks type defect that may display a horizontal line. When electric charges are stored in the undercut, the tick type defect may be displayed. However, in FIG. 12 and FIG. 13, the undercut may be prevented to decrease the tick type defects. Referring again to FIG. 3, the (ji)-th first connecting line BEji that electrically connects the (ji)-th storage voltage line SEji to the (j+1i) storage voltage line SEj+1i may be removed.

Moreover, the array substrate 311 may further include a common voltage line CVL that is electrically connected to the storage voltage line SE and applies a common voltage Vcom from an external device to the storage voltage line SE.

A portion of the common voltage line CVL and the storage voltage line SE are formed from substantially the same layer. The common voltage line CVL is formed in a peripheral area SA surrounding a display area DA that is defined by the pixels.

The common voltage line CVL includes a first common voltage line CVL1, which is formed in first peripheral area SA1 of the peripheral area SA, and a second common voltage line CVL2, which is formed in a third peripheral area SA3 facing the first peripheral area SA1.

The first common voltage line CVL1 and the storage voltage line SE are formed from different layers to electrically isolate the first common voltage line CVL1 from the storage voltage line SE. The gate TCP section 340 is formed in the first peripheral area SA1, and the gate TCP section 340 is electrically connected to the gate line GL. Therefore, the first common voltage line CVL1 and the storage voltage line SE are electrically connected to each other through the second connecting line BEp.

The second common voltage line CVL2 and the storage voltage line SE are formed from substantially the same layer in the third peripheral area SA3, and the second common voltage line CVL2 is electrically connected to the storage voltage line SE.

As explained above, in order to prevent a current difference caused by a RC delay that changes according to a position of the storage voltage line SE, the first and second common voltage lines CVL1 and CVL2 are electrically connected to each other in the first and third peripheral areas SA1 and SA3 of the array substrate 311. That is, the first and second common voltage lines CVL1 and CVL2 are electrically connected to each other at two ends of the storage voltage line SE. Alternatively, only one of the first and second common voltage lines CVL1 and CVL2 may be formed in the array substrate 311.

According to the array substrate 311 shown in FIG. 12 and FIG. 13, the storage voltage line SE includes a triple layered structure, so that the storage voltage lines SE are electrically connected to each other only on the two ends of the storage voltage line SE. The storage voltage line SE is electrically connected to the common voltage lines CVL1 and CVL2 through its two ends.

As described above with reference to FIGS. 5 to 11, the first connecting line BEji may be formed on the pixel elements to provide the storage voltage lines SE with the substantially uniform current corresponding to the common voltage Vcom, as shown in FIG. 13. For example, the first connecting line BEr may be formed on every unit pixel element UF, and it is electrically connected to storage voltage lines SE that are adjacent to each other in the second direction D2. The unit pixel element UF is defined by a red pixel element, a green pixel element, and a blue pixel element, which are arranged adjacent to each other to display a color.

In FIGS. 5 to 11, when the storage voltage lines SE are electrically connected to each other, the two ends of the storage voltage lines SE are electrically connected to the first and second common voltage lines CVL1 and CVL2, respectively, to form the electric contact points with the power supply line SL that extends in the first direction D1, the conductive connecting member 351, and the main voltage line MVL.

According to exemplary embodiments of the present invention, a distortion of the common voltage Vcom, which is induced by a current difference between pixels Pji that are spaced apart from each of the first and second common voltage lines CVL1 and CVL2, may be decreased.

Furthermore, according to exemplary embodiments of the present invention, the common voltage applying section that transmits a common voltage is formed on the storage voltage line, so that a uniform current may be applied to the storage voltage lines in substantially the entire display area. In particular, a substantially uniform current may be applied to the storage voltage lines in a central portion of the LCD panel. Therefore, distortion of the common voltage may be decreased, thereby increasing an LCD device's display quality.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An array substrate, comprising:
a base substrate comprising a display area and a peripheral area outside the display area, the display area comprising a plurality of pixels arranged in regions defined by a plurality of gate lines extending in a first direction and a plurality of data lines extending in a second direction;
a plurality of storage voltage lines extending in the first direction and arranged in the pixels;
a plurality of first connecting lines to electrically connect the storage voltage lines of adjacent pixels, the adjacent pixels being arranged in the second direction; and
a common voltage applying section arranged in the peripheral area, the common voltage applying section to apply a common voltage to the storage voltage lines that are arranged in a portion of the pixels arranged in the first direction, the common voltage applying section comprising a power supply line extending along at least one of the storage voltage lines in the first direction and a first common voltage line extending in the second direction, the power supply line being electrically connected to the first common voltage line,
wherein the array substrate further comprises a plurality of second connecting lines to each electrically connect respective storage voltage lines with the first common voltage line, and
wherein the first common voltage line is directly disposed on a first layer and the storage voltage lines are directly disposed on a second layer, the second layer being different from the first layer.

2. The array substrate of claim 1, wherein the power supply line is wider than the first common voltage line.

3. The array substrate of claim 2, wherein the power supply line is arranged in a second peripheral area of the peripheral area in the first direction.

4. The array substrate of claim 2, wherein the first common voltage line is electrically connected to a first end of at least one of the storage voltage lines through the second connecting line to provide the at least one storage voltage line with the common voltage.

5. The array substrate of claim 2, wherein the common voltage applying section further comprises a second common voltage line arranged along the second direction and on a third peripheral area facing a first peripheral area, the second common voltage line being electrically connected to the first common voltage line through the power supply line and to a second end of at least one storage voltage line.

6. The array substrate of claim 5, wherein the power supply line is arranged in a second peripheral area of the peripheral area in the first direction.

7. The array substrate of claim 5, wherein the second common voltage line is formed from the same layer as the second end of the at least one storage voltage line such that the second common voltage line is directly connected to the second end of the at least one storage voltage line.

8. The array substrate of claim 1,
wherein the second connecting lines electrically connect respective storage voltage lines with the first common voltage line through contact holes.

9. A liquid crystal display (LCD) panel, comprising:
a first substrate comprising a common electrode;
a second substrate opposingly disposed to the first substrate; and
a liquid crystal layer disposed between the first substrate and the second substrate, the second substrate comprising:
a base substrate comprising a display area and a peripheral area outside the display area, the display area comprising a plurality of pixels arranged in regions defined by a plurality of gate lines extending in a first direction and a plurality of data lines extending in a second direction;
a plurality of storage voltage lines arranged in the pixels;
a plurality of first connecting lines to electrically connect the storage voltage lines of adjacent pixels, the adjacent pixels being arranged in the second direction; and
a common voltage applying section arranged in the peripheral area, the common voltage applying section to apply a common voltage to the storage voltage lines that are arranged in a portion of the pixels arranged in the first direction, the common voltage applying section comprising a power supply line extending along at least one of the storage voltage lines in the first direction and a first common voltage line extending in the second direction, the power supply line being electrically connected to the first common voltage line,
wherein the second substrate further comprises a plurality of second connecting lines to each electrically connect respective storage voltage lines with the first common voltage line, and
wherein the first common voltage line is directly disposed on a first layer and the storage voltage lines are directly disposed on a second layer, the second layer being different from the first layer.

10. The LCD panel of claim 9, wherein the first substrate further comprises a color filter layer arranged in an area corresponding to the display area.

11. The LCD panel of claim 10, wherein the power supply line is wider than the first common voltage line.

12. The LCD panel of claim 11, wherein the power supply line is arranged in a second peripheral area of the peripheral area in the first direction.

13. The LCD panel of claim 11, wherein the first common voltage line is electrically connected to a first end of at least one of the storage voltage lines through the second connecting line to provide the at least one storage voltage line with the common voltage.

14. The LCD panel of claim 11, wherein the common voltage applying section further comprises a second common voltage line arranged along the second direction and on a third peripheral area facing a first peripheral area, the second common voltage line being electrically connected to the first common voltage line through the power supply line and to a second end of at least one storage voltage line.

15. The LCD panel of claim 14, wherein the power supply line is arranged in a second peripheral area of the peripheral area in the first direction.

16. The LCD panel of claim 14, wherein the second common voltage line is formed from the same layer as the second end of the at least one storage voltage line such that the second common voltage line is directly connected to the second end of the at least one storage voltage line.

17. A liquid crystal display (LCD) device, comprising
a backlight assembly to generate a light; and
a display panel assembly comprising a first substrate, a second substrate opposingly disposed to the first substrate, and a liquid crystal layer disposed between the first substrate and the second substrate, the display panel assembly to display an image using the light, the second substrate comprising:
  a base substrate comprising a display area and a peripheral area outside the display area, the display area comprising a plurality of pixels arranged in regions defined by a plurality of gate lines extending in a first direction and a plurality of data lines extending in a second direction;
  a plurality of storage voltage lines arranged in the pixels;
  a plurality of first connecting lines to electrically connect the storage voltage lines of adjacent pixels, the adjacent pixels being arranged in the second direction; and
  a common voltage applying section arranged in the peripheral area, the common voltage applying section to apply a common voltage to the storage voltage lines that are arranged in a portion of the pixels arranged in the first direction, the common voltage applying section comprising a power supply line extending along at least one of the storage voltage lines in the first direction and a first common voltage line extending in the second direction, the power supply line being electrically connected to the first common voltage line,
  wherein the second substrate further comprises a plurality of second connecting lines to each electrically connect respective storage voltage lines with the first common voltage line, and
  wherein the first common voltage line is disposed directly on a first layer and the storage voltage lines are directly disposed on a second layer, the second layer being different from the first layer.

18. The LCD device of claim 17, wherein the power supply line is wider than the first common voltage line.

19. The LCD device of claim 18, wherein the power supply line is arranged in a second peripheral area of the peripheral area in the first direction.

20. The LCD device of claim 18, wherein the first common voltage line is electrically connected to a first end of at least one of the storage voltage lines through the second connecting line to provide the at least one storage voltage line with the common voltage.

21. The LCD device of claim 18, wherein the common voltage applying section further comprises a second common voltage line arranged along the second direction and on a third peripheral area facing a first peripheral area, the second common voltage line being electrically connected to the first common voltage line through the power supply line and to a second end of at least one storage voltage line.

22. The LCD device of claim 21, wherein the power supply line is arranged in a second peripheral area of the peripheral area in the first direction.

23. The LCD device of claim 21, wherein the second common voltage line is formed from the same layer as the second end of the at least one storage voltage line such that the second common voltage line is directly connected to the second end of the at least one storage voltage line.

* * * * *

UNITED STATES PATENT AND TRADEMARK OFFICE
CERTIFICATE OF CORRECTION

| | |
|---|---|
| PATENT NO. | : 8,482,688 B2 |
| APPLICATION NO. | : 11/469974 |
| DATED | : July 9, 2013 |
| INVENTOR(S) | : Kim et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1107 days.

Signed and Sealed this
Thirtieth Day of December, 2014

Michelle K. Lee
*Deputy Director of the United States Patent and Trademark Office*